(12) United States Patent
Ji et al.

(10) Patent No.: US 11,202,265 B2
(45) Date of Patent: Dec. 14, 2021

(54) SIGNAL TRANSMISSION METHOD, TERMINAL DEVICE, AND NETWORK DEVICE

(71) Applicant: HUAWEI TECHNOLOGIES CO., LTD., Guangdong (CN)

(72) Inventors: Tong Ji, Beijing (CN); Zhe Jin, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/703,451

(22) Filed: Dec. 4, 2019

(65) Prior Publication Data
US 2020/0112925 A1 Apr. 9, 2020

Related U.S. Application Data

(63) Continuation of application No. PCT/CN2017/087227, filed on Jun. 5, 2017.

(51) Int. Cl.
*H04W 52/36* (2009.01)
*H04W 52/10* (2009.01)
*H04W 52/24* (2009.01)

(52) U.S. Cl.
CPC .......... *H04W 52/36* (2013.01); *H04W 52/10* (2013.01); *H04W 52/242* (2013.01)

(58) Field of Classification Search
CPC .................. H04W 88/02–06; H04W 88/08–18
See application file for complete search history.

(56) References Cited

U.S. PATENT DOCUMENTS

| 2013/0058315 A1* | 3/2013 | Feuersanger | ....... H04W 74/006 370/336 |
| 2013/0308575 A1* | 11/2013 | Chen | ................... H04W 52/367 370/329 |
| 2014/0098761 A1 | 4/2014 | Lee et al. | |
| 2015/0016312 A1* | 1/2015 | Li | ............................. H04L 5/14 370/280 |
| 2016/0255591 A1 | 9/2016 | Park et al. | |
| 2016/0262109 A1* | 9/2016 | Chen | ....................... H04W 4/70 |

(Continued)

FOREIGN PATENT DOCUMENTS

| CN | 104704884 A | 6/2015 |
| CN | 105101454 A | 11/2015 |

(Continued)

OTHER PUBLICATIONS

3GPP TS 36.331 V14.2.2 (Apr. 2017), "3rd Generation Partnership Project;Technical Specification Group Radio Access Network; Evolved Universal Terrestrial Radio Access (E-UTRA); Radio Resource Control (RRC); Protocol specification (Release 14)," Apr. 2017, 720 pages.

(Continued)

*Primary Examiner* — San Htun
(74) *Attorney, Agent, or Firm* — Fish & Richardson P.C.

(57) ABSTRACT

This application provides a signal transmission method, a terminal device, and a network device. The method includes: determining, by a terminal device, a first transmit power based on an access status of the terminal device at a current coverage level and/or a first power control parameter; and transmitting a signal at the first transmit power.

10 Claims, 3 Drawing Sheets

(56) References Cited

U.S. PATENT DOCUMENTS

| | | | |
|---|---|---|---|
| 2016/0353440 A1* | 12/2016 | Lee | H04W 72/0453 |
| 2017/0245158 A1 | 8/2017 | Xiao et al. | |
| 2017/0303204 A1 | 10/2017 | Hu et al. | |
| 2019/0075602 A1* | 3/2019 | Lin | H04W 72/0453 |
| 2020/0145938 A1 | 5/2020 | Zhang et al. | |

FOREIGN PATENT DOCUMENTS

| | | | |
|---|---|---|---|
| CN | 105379336 A | 3/2016 | |
| CN | 105637969 A | 6/2016 | |
| CN | 105992328 A | 10/2016 | |
| CN | 106454694 A | 2/2017 | |
| KR | 20160114111 A | 10/2016 | |
| KR | 20160114688 A | 10/2016 | |
| WO | 2015113229 A1 | 8/2015 | |
| WO | 2015116732 A1 | 8/2015 | |
| WO | 2016070423 A1 | 5/2016 | |

OTHER PUBLICATIONS

3GPP TS 36.213 V14.2.0 (Mar. 2017);3rd Generation Partnership Project;Technical Specification Group Radio Access Network;Evolved Universal Terrestrial Radio Access (E-UTRA);Physical layer procedures(Release 14);total 454 pages, Best Available Date: Mar. 2017.

3GPP TS 36.321 V14.2.1 (Mar. 2017), "3rd Generation Partnership Project;Technical Specification Group Radio Access Network; Evolved Universal Terrestrial Radio Access (E-UTRA); Medium Access Control (MAC) protocol specification (Release 14)," Mar. 2017, 106 pages.

Extended European Search Report issued in European Application No. 17913008.3 dated Apr. 20, 2020, 7 pages.

Huawei et al., "Consideration on PRACH power ramping," 3GPP TSG RAN WG2 Meeting #92, R2-156469, Anaheim, USA, Nov. 16-20, 2015, 4 pages.

Office Action issued in Chinese Application No. 201780091411.8 dated May 22, 2020, 29 pages (with English translation).

PCT International Search Report and Written Opinion issued in International Application No. PCT/CN2017/087227 dated Feb. 24, 2018, 13 pages (with English translation).

Office Action issued in Korean Application No. 10-2020-7000060 dated Aug. 18, 2020, 10 pages (With English Translation).

Huawei, HiSilicon, "PRACH transmission power setting," 3GPP TSG RAN WG1 Meeting #80bis, R1-151878, Belgrade, Serbia, Apr. 20-24, 2015, 4 pages.

Office Action issued in Japanese Application No. 2019-566778 dated Mar. 2, 2021, 6 pages (with English translation).

Office Action issued in Indian Application No. 201937051840 dated Mar. 11, 2021, 6 pages.

* cited by examiner

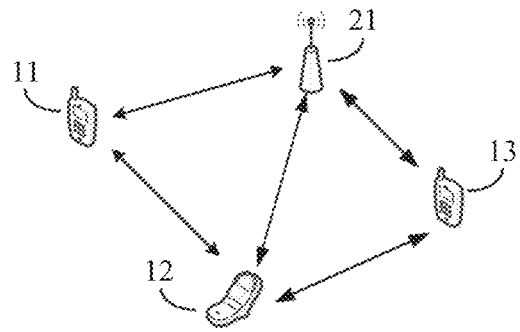

| A terminal device determines a first transmit power based on an access status of the terminal device at a current coverage level and/or a first power control parameter | S210 |

| Transmit a signal at the first transmit power | S220 |

| A network device sends first indication information to a terminal device, where the first indication information is used to indicate at least one of first power control parameters | S310 |

| The network device receives a signal transmitted by the terminal device at a first transmit power, where the first transmit power is determined by the terminal device based on an access status of the terminal device at a current coverage level and/or the first power control parameter | S320 |

FIG. 3

SIGNAL TRANSMISSION METHOD, TERMINAL DEVICE, AND NETWORK DEVICE

CROSS-REFERENCE TO RELATED APPLICATIONS

This application is a continuation of International Application No. PCT/CN2017/087227, filed on Jun. 5, 2017, the disclosure of which is hereby incorporated by reference in its entirety.

TECHNICAL FIELD

This application relates to the communications field, and more specifically, to a signal transmission method, a terminal device, and a network device.

BACKGROUND

Currently, in a narrowband internet of things (Narrow Band Internet of Things, NB-IoT) system, transmit power is determined in an open-loop power control manner in uplink transmission. For a signal on a narrowband physical random access channel (Narrowband Physical Random Access Channel, NPRACH) in the NB-IoT system: When the signal is at a coverage level 0, a terminal device enables open-loop power control to determine transmit power of the signal on the NPRACH. When the signal is at a coverage level 1 or 2, the signal is directly sent on the NPRACH based on a maximum transmit power of the terminal device. In many cases, the terminal device directly uses the maximum transmit power to send the signal.

However, in an interference-limited communications network or a communications network with relatively heavy load, the method for determining transmit power in the prior art easily aggravates mutual interference between signals of terminal devices. Therefore, a method to resolve a problem of the signal interference between the terminal devices needs to be proposed.

SUMMARY

Embodiments of this application provide a signal transmission method, a terminal device, and a network device, which can reduce interference to uplink transmission of another terminal device.

According to a first aspect, a signal transmission method is provided, including:
determining, by a terminal device, a first transmit power based on an access status of the terminal device at a current coverage level and/or a first power control parameter and
transmitting a signal at the first transmit power.

In this embodiment of this application, the terminal device may determine the first transmit power based on the access status of the terminal device at the current coverage level and/or the first power control parameter, and transmit the signal at the first transmit power, so as to reduce interference between terminal devices.

Optionally, the access status of the terminal device at the current coverage level may be represented by using first determining information.

Optionally, the terminal device may actively learn of the first determining information. Alternatively, the terminal device may obtain the first determining information from a network device. This is not limited in this application.

Optionally, the first power control parameter includes at least one of the following parameters:
reference signal received power RSRP, a downlink path loss, a transmission bandwidth parameter, a maximum transmit power of the terminal device, a preamble target received power, an initial preamble target received power, an initial transmit power, a preamble power offset, a quantity of preamble attempts, a power ramping step, a path loss conversion proportional coefficient, repetition times for sending a preamble, and a power indication parameter.

Optionally, the first determining information may indicate the access status of the terminal device at the current coverage level. For example, the first determining information may be used to indicate that the terminal device selects the current coverage level during initial random access.

Alternatively, the first determining information may be used to indicate that the terminal device is switched from a non-current coverage level to the current coverage level.

In some possible implementations, that the terminal device determines the first transmit power based on the first determining information and/or the first power control parameter includes:
determining, by the terminal device, the first transmit power based on the first determining information and the first power control parameter.

Optionally, the determining, by the terminal device, the first transmit power based on the first determining information and the first power control parameter includes:
when the first determining information indicates that the terminal device is switched from a non-current coverage level to the current coverage level, calculating, by the terminal device, the first transmit power based on at least one of the first power control parameters by using an open-loop power control calculation method; or
when the terminal device selects the current coverage level during initial random access, using, by the terminal device, the maximum transmit power of the terminal device as the first transmit power.

Therefore, the terminal device may select or calculate a proper first transmit power based on the first determining information and the first power control parameter, and does not need to directly transmit an uplink signal at the maximum transmit power, thereby reducing interference to uplink transmission of another terminal device.

In some possible implementations, that the terminal device determines the first transmit power based on the first determining information and/or the first power control parameter includes:
determining, by the terminal device, the first transmit power based on the first power control parameter.

Optionally, the first power control parameter includes the downlink path loss, and the determining, by the terminal device, the first transmit power based on the first power control parameter includes:
when the downlink path loss of the terminal device is greater than a first path loss threshold, using, by the terminal device, the maximum transmit power of the terminal device as the first transmit power, where the first path loss threshold is notified by a network device to the terminal device: or
when the downlink path loss of the terminal device is less than or equal to the first path loss threshold, calculating, by the terminal device, the first transmit power by using an open-loop power control calculation method.

Optionally, the first power control parameter includes a reference signal received power RSRP value, and the determining, by the terminal device, the first transmit power based on the first power control parameter includes:

when the reference signal received power RSRP value measured by the terminal device is greater than a first RSRP threshold, using, by the terminal device, the maximum transmit power of the terminal device as the first transmit power, where the first RSRP threshold is notified by a network device to the terminal device; or when the reference signal received power RSRP value measured by the terminal device is less than or equal to the first RSRP threshold, calculating, by the terminal device, the first transmit power by using an open-loop power control calculation method.

Optionally, if the terminal device uses another parameter in the first power control parameter as a determining condition for calculating the first transmit power, the network device may indicate, to the terminal device, a critical value or a threshold of the parameter that is used, so that a power control method for the terminal device more adapts to a network feature. For example, the network device may indicate, to the terminal device, critical repetition times for sending a preamble.

Therefore, the terminal device may select or calculate a proper first transmit power based on the first power control parameter, and does not need to directly transmit an uplink signal at the maximum transmit power, thereby reducing interference to uplink transmission of another terminal device.

In some possible implementations, that the terminal device determines the first transmit power based on the first determining information and/or the first power control parameter includes:

determining, by the terminal device, the first transmit power based on the first determining information.

Optionally, the determining, by the terminal device, the first transmit power based on the first determining information includes:

when the first determining information indicates that the terminal device selects the current coverage level during initial random access, using, by the terminal device, the maximum transmit power of the terminal device as the first transmit power.

Therefore, after determining is performed based on the first determining information, the terminal device may determine whether to use the maximum transmit power as the first transmit power, so that the terminal device does not directly use the maximum transmit power to transmit an uplink signal, thereby reducing interference to uplink transmission of another terminal device.

Optionally, the calculating the first transmit power by using an open-loop power control calculation method includes:

calculating the first transmit power by using the following formulas:

$$P_{NPRACH} = \min\left\{ \begin{array}{l} P_{CMAX,c}(i), \\ P_{PRT} + PL_c \end{array} \right\}, \text{ and}$$

$$P_{PRT} = P_{PIRT} + P_{DP} + (N_{p1} - 1) \times P_s - 10\log_{10} N_{p2},$$

where $P_{NPRACH}$ represents the first transmit power; dBm represents a unit of the first transmit power; $P_{CMAX,c}(i)$ represents the maximum transmit power of the terminal device; C is a cell number; i is a subframe number; $P_{PRT}$ represents a preamble target received power; represents a downlink path loss of a cell c; $P_{PIRT}$ represents an initial preamble target received power; $P_{DP}$ represents a preamble power offset; $N_{P1}$ represents a quantity of preamble attempts; $P_s$ represents a power ramping step; and $N_{P2}$ represents a quantity of repetition times for sending a preamble.

The foregoing formulas are merely used as an example herein to describe the open-loop power control calculation method, and there may be another possible open-loop power control calculation manner in the future.

According to a second aspect, a signal transmission method is provided, including:

sending, by a network device, first indication information to a terminal device, where the first indication information is used to indicate at least one of first power control parameters; and receiving, by the network device, a signal transmitted by the terminal device at a first transmit power, where the first transmit power is determined by the terminal device based on an access status of the terminal device at a current coverage level and/or the first power control parameter.

Optionally, the first power control parameter includes at least one of the following parameters:

reference signal received power RSRP, a downlink path loss, a transmission bandwidth parameter, a maximum transmit power of the terminal device, a preamble target received power, an initial preamble target received power, an initial transmit power, a preamble power offset, a quantity of preamble attempts, a power ramping step, a path loss conversion proportional coefficient, repetition times for sending a preamble, and a power indication parameter.

Therefore, the network device receives the signal transmitted by the terminal device at the first transmit power, and the first transmit power is determined by the terminal device based on the access status of the terminal device at the current coverage level and/or the first power control parameter, thereby reducing interference between terminal devices.

According to a third aspect, a terminal device is provided and is configured to perform the method according to any one of the first aspect or the possible implementations of the first aspect. Specifically, the terminal device includes modules configured to perform the method according to any one of the first aspect or the possible implementations of the first aspect.

According to a fourth aspect, a network device is provided and is configured to perform the method according to any one of the second aspect or the possible implementations of the second aspect. Specifically, the network device includes modules configured to perform the method according to any one of the second aspect or the possible implementations of the second aspect.

According to a fifth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method according to any one of the first aspect or the possible implementations of the first aspect.

According to a sixth aspect, a network device is provided. The network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method according to any one of the first aspect or the possible implementations of the first aspect.

According to a seventh aspect, a computer-readable storage medium is provided. The computer-readable storage medium stores a program, and the program enables a terminal device to perform the signal transmission method according to any one of the first aspect and the implementations of the first aspect.

According to an eighth aspect, a computer-readable storage medium is provided. The computer-readable storage medium stores a program. The program enables a network device to perform the signal transmission method according to any one of the second aspect and the implementations of the second aspect.

BRIEF DESCRIPTION OF DRAWINGS

FIG. 1 is a schematic diagram of an application scenario;

FIG. 2 is a schematic flowchart of a signal transmission method according to an embodiment of this application;

FIG. 3 is a schematic flowchart of a signal transmission method according to another embodiment of this application;

DESCRIPTION OF EMBODIMENTS

Figure 4:
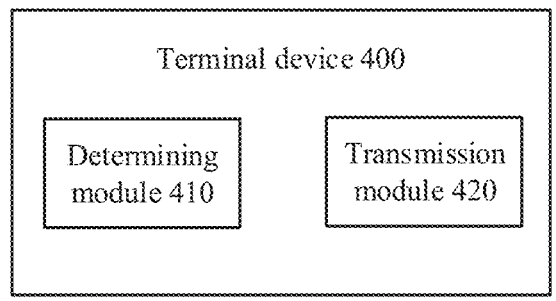
FIG. 4 is a schematic block diagram of a terminal device according to an embodiment of this application.

The following describes the technical solutions in this application with reference to the accompanying drawings.

It should be understood that the technical solutions in the embodiments of this application may be applied to various communications systems or internet of things (Internet of Things, IoT) systems, for example, existing systems such as a global system for mobile communications (Global System of Mobile communications, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LIE frequency division duplex (Frequency Division Duplex, FDD) system, an LIE time division duplex (Time Division Duplex, TDD) system, a universal mobile telecommunications system (Universal Mobile Telecommunications System, UMTS), and a narrowband internet of things (Narrow Band Internet of Things, NB-IoT) system; and in particular, applied to a future 5G new radio (New Radio, NR) system or an 5G system, or a communications system based on an orthogonal frequency division multiplexing (Orthogonal Frequency Division Multiplexing, OFDM) technology.

It should further be understood that in the embodiments of this application, a network device may be referred to as a network device side, a base station, or the like. The base station may be a base transceiver station (Base Transceiver Station, BTS) in a GSM or CDMA system, may be a NodeB (NodeB) in a WCDMA system, and may be an evolved NodeB (Evolutional NodeB, eNB, or eNodeB) in LIE, or a gNB in a future 5G network. This is not limited in this application.

It should be further understood that in the embodiments of this application, a terminal device may communicate with one or more core networks (Core Network) by using a radio access network (Radio Access Network, RAN) The terminal device may be referred to as an access terminal, user equipment (User Equipment, UE), a subscriber unit, a subscriber station, a mobile station (Mobile Station), a mobile (Mobile) console, a remote station, a remote terminal (Remote Terminal), a mobile device, a user terminal (User Terminal), a terminal, radio communications equipment, a user agent (User Agent), or a user device (User Device). The terminal device may be a cellular phone, a cordless phone, a session initiation protocol (Session Initiation Protocol, SIP) phone, a wireless local loop (Wireless Local Loop, WLL) station, a personal digital processing (Personal Digital Assistant, PDA), a handheld device with a wireless communication function, a device providing voice and/or data connectivity for a user, a handheld device with a wireless connection function, a computing device, or another processing device connected to a wireless modem, a vehicle-mounted device, a wearable device, a terminal device in a future 5G network, or the like.

FIG. 1 is a schematic diagram of a scenario. It should be understood that, for ease of understanding, herein the scenario in FIG. 1 is introduced as an example for description, but does not constitute any limitation to this application. FIG. 1 shows a terminal device 11, a terminal device 12, a terminal device 13, and a base station 21.

As shown in FIG. 1, the terminal device 11 may communicate with the base station 21, the terminal device 12 may communicate with the base station 21, and the terminal device 13 communicates with the base station 21. Alternatively, the terminal device 12 may communicate with the terminal device 11. Alternatively, in another case, the terminal device 13 communicates with the terminal device 12, FIG. 2 is a schematic flowchart of a signal transmission method 200 according to an embodiment of this application. The method 200 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 2, the method 200 includes the following steps:

S210. The terminal device determines a first transmit power based on an access status of the terminal device at a current coverage level and/or a first power control parameter.

Optionally, the access status of the terminal device at the current coverage level may be represented by using first determining information.

Optionally, the terminal device may actively learn of the first determining information. Alternatively, the terminal device may obtain the first determining information from the network device. This is not limited.

Optionally, the first power control parameter includes at least one of the following parameters:

reference signal received power (Reference Signal Received Power RSRP), a downlink path loss, a transmission bandwidth parameter, a maximum transmit power of the terminal device, a preamble target received power, an initial preamble target received power, an initial transmit power, a preamble power offset, a quantity of preamble attempts, a power ramping step, a path loss conversion proportional coefficient, repetition times for sending a preamble_ and a power indication parameter. Optionally, the power indication parameter may be used to indicate a parameter that may be used by the terminal device in a power control process and that is other than the foregoing several parameters, or a power parameter that may appear in the future or may be newly introduced in the future. For example, the power indication parameter may be a power adjustment factor.

Optionally, the first determining information may indicate the access status of the terminal device at the current coverage level. For example, the first determining information may be used to indicate that the terminal device selects the current coverage level during initial random access. For example, the first determining information may be used to indicate that the terminal device selects a coverage level 0, a coverage level 1, or a coverage level 2 during first random access.

Alternatively, the first determining information may be used to indicate that the terminal device is switched from a non-current coverage level to the current coverage level. For example, the first determining information indicates that the terminal device is switched from a coverage level 0 to a coverage level 1, or indicates that the terminal device is switched from a coverage level 1 to a coverage level 2. Specifically, for example, the terminal device may select the coverage level 1 if the terminal device attempts a plurality of times and access fails at the coverage level 0. Alternatively, the terminal device may select the coverage level 2 if the terminal device attempts a plurality of times and access fails at the coverage level 1.

S220. The terminal device transmits a signal at the first transmit power.

Specifically, the terminal device may determine the first transmit power based on the access status of the terminal device at the current coverage level and/or the first power control parameter, and transmit a signal on a narrowband physical random access channel (Narrowband Physical Random Access Channel, NPRACH) at the first transmit power. In other words, the terminal device may select a proper transmit power based on an actual requirement, to transmit an uplink signal relatively quickly, and to reduce interference to uplink transmission of another terminal device.

In this embodiment of this application, the terminal device may determine the first transmit power based on the access status of the terminal device at the current coverage level and/or the first power control parameter, thereby reducing interference between terminal devices. However, in the prior art, the terminal device can transmit a signal based only on a default maximum transmit power at some coverage levels, which causes relatively large interference to uplink transmission of another terminal device.

The following uses an example in which "the first determining information indicates the access status of the terminal device at the current coverage level" for description. However, "the first determining information" may not be introduced in practice. This is not limited in this embodiment of this application.

Optionally, in an embodiment, that the terminal device determines the first transmit power based on the first determining information and/or the first power control parameter includes:

determining, by the terminal device, the first transmit power based on the first determining information and the first power control parameter.

Specifically, the terminal device may calculate the first transmit power with reference o the first determining information and the first power control parameter.

Optionally, the determining, by the terminal, the first transmit power based on the first determining information and the first power control parameter includes:

when the first determining information indicates that the terminal device is switched from a non-current coverage level to the current coverage level, calculating, by the terminal device, the first transmit power based on at least one of the first power control parameters by using an open-loop power control calculation method; or when the first determining information indicates that the terminal device selects the current coverage level during initial random access, calculating, by the terminal device, the first transmit power based on at least one of the first power control parameters by using an open-loop power control calculation method.

Specifically, in a first case: If the first determining information indicates that the terminal device is switched from the non-current coverage level to the current coverage level, the terminal device may calculate the first transmit power by using the open-loop power control calculation method. Alternatively, in a second case: If the first determining information indicates that the terminal device selects the current coverage level during initial random access, the terminal device may calculate the first transmit power by using the open-loop power control calculation method. It should be noted that the at least one of the first power control parameters used by the terminal device in the first case is different from that used in the second case. The non-current coverage level is different from the current coverage level.

For example, it is assumed that the current coverage level is the coverage level 1. In the first case, the terminal device is switched from the coverage level 0 to the coverage level 1, and then the terminal device may calculate the first transmit power by using the open-loop power control calculation method. In the second case, the terminal device selects the coverage level 1 during initial random access, and then the terminal device may calculate the first transmit power by using the open-loop power control calculation method. The at least one of the first power control parameters used by the terminal device in the first case is different from that used in the second case.

Optionally, when the first determining information indicates that the terminal device is switched from a non-current coverage level to the current coverage level, the terminal device calculates the first transmit power based on at least one of the first power control parameters by using an open-loop power control calculation method.

When the first determining information indicates that the terminal device selects the current coverage level during initial random access, the terminal device uses a maximum transmit power of the terminal device as the first transmit power.

Specifically, in a first case: If the first determining information indicates that the terminal device is switched from the non-current coverage level to the current coverage level, the terminal device may calculate the first transmit power by using the open-loop power control calculation method. In a second case: If the first determining information indicates that the terminal device selects the current coverage level during initial random access, the terminal device may use a maximum transmit power of the terminal device as the first transmit power.

Alternatively, optionally, when the first determining information indicates that the terminal device is switched from a non-current coverage level to the current coverage level, the terminal device uses a maximum transmit power of the terminal device as the first transmit power.

When the first determining information indicates that the terminal device selects the current coverage level during initial random access, the terminal device calculates the first transmit power based on at least one of the first power control parameters by using an open-loop power control calculation method.

Specifically, in a first case: if the first determining information indicates that the terminal device is switched from the non-current coverage level to the current coverage level, the terminal device may use the maximum transmit power of the terminal device as the first transmit power. In a second case: If the first determining information indicates that the terminal device selects the current coverage level during initial random access, the terminal device may calculate the first transmit power by using the open-loop power control calculation method.

Optionally, in an embodiment, that the terminal determines the first transmit power based on the first determining information and the first power control parameter includes:

when the first determining information indicates that the terminal device is switched from a non-current coverage level to the current coverage level, and an RSRP value measured by the terminal device is within a first RSRP range or a downlink path loss is within a first path loss range, calculating, by the terminal device, the first transmit power based on at least one of the first power control parameters by using an open-loop power control method; or when the first determining information indicates that the terminal device selects the current coverage level during initial access, or when an RSRP value measured by the terminal device is within a second RSRP range or a downlink path loss is within a second path loss range, using, by the terminal device, a maximum transmit power of the terminal device as the first transmit power.

Specifically; in a first case: If the first determining information indicates that the terminal device is switched from the non-current coverage level to the current coverage level, and the RSRP value measured by the terminal device is within the first RSRP range or the downlink path loss is within the first path loss range, the terminal device may calculate the first transmit power by using the open-loop power control calculation method. In a second case: If the first determining information indicates that the terminal device selects the current coverage level during initial random access, and the RSRP value measured by the terminal device is within the second RSRP range or the path loss is within the second path loss range, the terminal device may use the maximum transmit power of the terminal device as the first transmit power. The second RSRP range is different from the first RSRP range, and the second path loss range is different from the first path loss range. For example, the second RSRP range may be a subset of an RSRP universal set in which the first RSRP range is excluded. For example, the second path loss range may be a subset of a path loss universal set in which the first path loss range is excluded.

Alternatively, optionally, in an embodiment, that the terminal determines the first transmit power based on the first determining information and the first power control parameter includes:

when the first determining information indicates that the terminal device is switched from a non-current coverage level to the current coverage level, and an RSRP value measured by the terminal device is within a third RSRP range or a downlink path loss is within a third path loss range, using, by the terminal device, a maximum transmit power of the terminal device as the first transmit power or when the first determining information indicates that the terminal device selects the current coverage level during initial access, or when an RSRP value measured by the terminal device is within a fourth RSRP range or a downlink path loss is within a fourth path loss range, calculating, by the terminal device, the first transmit power based on at least one of the first power control parameters by using an open-loop power control method. The fourth RSRP range is different from the third RSRP range, and the fourth path loss range is different from the third path loss range. For example, the fourth RSRP range may be a subset of an RSRP universal set in which the third RSRP range is excluded. For example, the fourth path loss range may be a subset of a path loss universal set in which the third path loss range is excluded.

Alternatively, optionally, in an embodiment, that the terminal determines the first transmit power based on the first determining information and the first power control parameter includes:

when the first determining information indicates that the terminal device is switched from a non-current coverage level to the current coverage level, and an RSRP value measured by the terminal device is within a fifth RSRP range or a downlink path loss is within a fifth path loss range, calculating, by the terminal device, the first transmit power based on at least one of the first power control parameters by using an open-loop power control method; or when the first determining information indicates that the terminal device selects the current coverage level during initial access, or when an RSRP value measured by the terminal device is within a sixth RSRP range or a downlink path loss is within a sixth path loss range, calculating, by the terminal device, the first transmit power based on at least one of the first power control parameters by using an open-loop power control method.

The at least one of the first power control parameters used by the terminal device to calculate the first transmit power in the case of "switching from a non-current coverage level to the current coverage level" is different from that in the case "selecting the current coverage level during initial access". The sixth RSRP range is different from the fifth RSRP range, and the sixth path loss range is different from the fifth path loss range. For example, the sixth RSRP range may be a subset of an RSRP universal set in which the fifth RSRP range is excluded. For example, the sixth path loss range may be a subset of a path loss universal set in which the fifth path loss range is excluded.

Therefore, the terminal device may select or calculate a proper first transmit power based on the first determining information and the first power control parameter, and does not need to directly transmit an uplink signal at the maximum transmit power, thereby reducing interference to uplink transmission of another terminal device.

Optionally, the calculating the first transmit power by using an open-loop power control calculation method includes:

calculating the first transmit power by using the following formulas:

$$P_{NPRACH} = \min\left\{ \begin{array}{l} P_{CMAX,c}(i), \\ P_{PRT} + PL_c \end{array} \right\} (\text{dBm, and}$$

$$P_{PRT} = P_{PIRT} + P_{DP} + (N_{p1} - 1) \times P_s - 10\log_{10}N_{p2},$$

where $P_{NPRACH}$ represents the first transmit power; dBm represents a unit of the first transmit power; $P_{CMAX,c}(i)$ represents the maximum transmit power of the terminal device; c is a cell number; i is a subframe number; $P_{PRT}$ represents a preamble target received power; $PL_c$ represents a downlink path loss of a cell c; $P_{PIRT}$ represents an initial preamble target received power; $P_{DP}$ represents a preamble power offset; $N_{P1}$ represents a quantity of preamble attempts; $P_s$ represents a power ramping step; and $N_{P2}$ represents a quantity of repetition times for sending a preamble. Specifically, $P_{CMAX,c}(i)$ represents a maximum transmit power used by the terminal device to send, on a subframe i in the cell c, a signal of a physical random access channel. $N_{P1}$ specifically refers to a quantity of attempt times for transmitting a preamble. For example, when the terminal device attempts to perform fifth transmission, a value of $N_{P1}$ is 5.

It should be understood that the foregoing formulas are merely used as an example herein to describe a calculation manner of the open-loop power control calculation method, and there may be another possible open-loop power control calculation manner in the future. This is not limited in this embodiment of this application.

It should be further understood that, for a case below in which the first transmit power needs to be calculated by using the open-loop power control calculation method, refer to the foregoing formulas. For brevity, details are not described below.

It should be further understood that numbers "first", "second", ..., and the like introduced in this embodiment of this application are merely intended to distinguish different objects, for example, distinguish different "path loss ranges", or distinguish different "RSRP ranges", and does not constitute any limitation to this embodiment of this application.

Optionally, in an embodiment, that the terminal device determines the first transmit power based on the first determining information and/or the first power control parameter includes:

determining, by the terminal device, the first transmit power based on the first power control parameter.

Specifically, the terminal device may calculate the first transmit power based on the first power control parameter.

Optionally, the first power control parameter includes the downlink path loss, and the determining, by the terminal device, the first transmit power based on the first power control parameter includes:

when the downlink path loss of the terminal device is within a seventh path loss range, calculating, by the terminal device, the first transmit power based on at least one of the first power control parameters by using an open-loop power control calculation method; or when the downlink path loss of the terminal device is within an eighth path loss range, using, by the terminal device, a maximum transmit power of the terminal device as the first transmit power. For example, the eighth path loss range may be a subset of a path loss universal set in which the seventh path loss range is excluded.

Specifically, for example, when the downlink path loss of the terminal device is greater than a first path loss threshold, the terminal device uses the maximum transmit power of the terminal device as the first transmit power; or when the downlink path loss of the terminal device is less than or equal to the first path loss threshold, the terminal device calculates the first transmit power based on the at least one of the first power control parameters by using the open-loop power control calculation method.

Specifically, the terminal device may determine, based on a path loss, a calculation manner of the first transmit power. Specifically, the following is included: if the downlink path loss of the terminal device is greater than a threshold (for example, the first path loss threshold), the terminal device may use, by default, the maximum transmit power as the first transmit power; or if the downlink path loss of the terminal device is less than or equal to the first path loss threshold, the terminal device may calculate the first transmit power by using the open-loop power control calculation method.

For another example, when the downlink path loss of the terminal device is greater than or equal to a first path loss threshold, the terminal device uses the maximum transmit power of the terminal device as the first transmit power; or when the downlink path loss of the terminal device is less than the first path loss threshold, the terminal device calculates the first transmit power based on the at least one of the first power control parameters by using the open-loop power control calculation method.

For another example, when the downlink path loss of the terminal device is greater than a first path loss threshold, or is equal to the first path loss threshold, or is less than the first path loss threshold, the terminal device calculates the first transmit power by using the open-loop power control calculation method. In addition, the at least one of the first power control parameters used by the terminal device to calculate the first transmit power is different in the three cases of "greater than", "equal to", and "less than".

It should be noted that the path loss ranges (including the path loss ranges with numbers) or the first path loss threshold in the foregoing embodiments may be agreed on in a protocol, or may be configured by the network device, so that the terminal device can select a calculation manner of the first transmit power based on the first path loss threshold.

Optionally, the first power control parameter includes a reference signal received power RSRP value, and the determining, by the terminal device, the first transmit power based on the first power control parameter includes:

when the reference signal received power RSRP value measured by the terminal device is within a seventh RSRP range, calculating, by the terminal device, the first transmit power based on at least one of the first power control parameters by using an open-loop power control calculation method; or when the reference signal received power RSRP value measured by the terminal device is within an eighth RSRP range, using, by the terminal device, the maximum transmit power of the terminal device as the first transmit power. The eighth RSRP range is different from the seventh RSRP range, and the eighth path loss range is different from the seventh path loss range. For example, the eighth RSRP range may be a subset of an RSRP universal set in which the seventh RSRP range is excluded.

Specifically, for example, when the reference signal received power RSRP value measured by the terminal device is greater than a first RSRP threshold, the terminal device calculates the first transmit power by using the open-loop power control calculation method, and the first RSRP threshold is notified by the network device to the terminal device; or when the reference signal received power RSRP value measured by the terminal device is less than or equal to the first RSRP threshold, the terminal device uses the maximum transmit power of the terminal device as the first transmit power.

Specifically; the terminal device may determine a calculation manner of the first transmit power based on the reference signal received power RSRP value. Specifically, the following is included: If the reference signal received power RSRP value measured by the terminal device is greater than a threshold (for example, the first RSRP threshold), the terminal device uses, by default, the maximum transmit power as the first transmit power; or if the reference signal received power RSRP value measured by the terminal device is less than or equal to the first RSRP threshold, the terminal device may calculate the first transmit power by using the open-loop power control calculation method.

For another example, when the reference signal received power RSRP value measured by the terminal device is greater than or equal to the first RSRP threshold, the terminal device calculates the first transmit power based on at least one of the first power control parameters by using the open-loop power control calculation method, and the first RSRP threshold is notified by the network device to the terminal device; or when the reference signal received power RSRP value measured by the terminal device is less than the first RSRP threshold, the terminal device uses the maximum transmit power of the terminal device as the first transmit power.

For another example, when the reference signal received power RSRP value measured by the terminal device is greater than the first RSRP threshold, or is equal to the first RSRP threshold, or is less than the first RSRP threshold, the terminal device calculates the first transmit power by using the open-loop power control calculation method. In addition, the at least one of the first power control parameters used by the terminal device to calculate the first transmit power is different in the three cases of "greater than", "equal to", and "less than".

It should be noted that, the RSRP ranges (including the RSRP ranges with numbers) or the first RSRP threshold in the foregoing embodiments may be specified in a protocol, or may be configured by the network device, so that the terminal device can select a calculation manner of the first transmit power based on the first RSRP threshold.

It should be understood that the foregoing description merely uses the downlink path loss and the reference signal received power RSRP value as examples. The terminal device may alternatively use another parameter in the first power control parameter as a determining condition for calculating the first transmit power, for example, whether a coverage level of the terminal device is initial access, a quantity of attempt times for sending a preamble by the terminal device. This is not limited in this embodiment of this application.

Optionally, if the terminal device uses the another parameter in the first power control parameter as the determining condition for calculating the first transmit power, the network device may indicate, to the terminal device, a critical value or a threshold of the parameter that is used, so that a power control method for the terminal device more adapts to a network feature. For example, the network device may indicate, to the terminal device, critical repetition times for sending a preamble.

Therefore, the terminal device may select or calculate a proper first transmit power based on the first power control parameter, and does not need to directly transmit an uplink signal at the maximum transmit power, thereby reducing interference to uplink transmission of another terminal device.

Optionally, in an embodiment, that the terminal device determines the first transmit power based on the first determining information and/or the first power control parameter includes:

determining, by the terminal device, the first transmit power based on the first determining information.

Specifically, the terminal device may determine the first transmit power based on the first determining information.

Optionally, the determining, by the terminal device, the first transmit power based on the first determining information includes:

when the first determining information indicates that the terminal device selects the current coverage level during initial random access, using, by the terminal device, the maximum transmit power of the terminal device as the first transmit power.

Specifically, if the first determining information indicates that the terminal device selects the current coverage level during initial random access, the terminal device may use, by default, the maximum transmit power of the terminal device as the first transmit power.

For example, assuming that the first determining information indicates that the terminal device selects a coverage level 1 during initial random access, the terminal device may transmit, by default, a signal based on the maximum transmit power of the terminal device. Alternatively, assuming that the first determining information indicates that the terminal device selects a coverage level 2 during initial random access, the terminal device may transmit, by default, a signal based on the maximum transmit power of the terminal device.

Therefore, after determining is completed based on the first determining information, the terminal device may determine whether to use the maximum transmit power as the first transmit power, so that the terminal device does not directly use the maximum transmit power to transmit an uplink signal, thereby reducing interference to uplink transmission of another terminal device.

The following describes the method according to this embodiment of this application from a network device side. For brevity, terms or concepts similar to those on a terminal device side are not described again. FIG. 3 is a schematic flowchart of a signal transmission method 300 according to an embodiment of this application. The method 300 may be performed by a network device. For example, the network device may be the base station 21 in FIG. 1. Correspondingly, a terminal device that communicates with the network device may be the terminal device 11, the terminal device 12, or the terminal device 13 in FIG. 1. As shown in FIG. 3, the method 300 includes the following steps:

S310, The network device sends first indication information to the terminal device, where the first indication information is used to indicate at least one of first power control parameters.

S320. The network device receives a signal transmitted by the terminal device at a first transmit power, where the first transmit power is determined by the terminal device based on an access status of the terminal device at a current coverage level and/or the first power control parameter.

Optionally, the first indication information may indicate some parameters in the first power control parameters.

Optionally, the terminal device may obtain the first power control parameter independently, in other words, the terminal device may not rely on the parameters indicated by the first indication information.

Optionally, the first power control parameter includes at least one of the following parameters:

reference signal received power RSRP, a downlink path loss, a transmission bandwidth parameter, a maximum transmit power of the terminal device, a preamble target received power, an initial preamble target received power, an initial transmit power, a preamble power offset, a quantity of preamble attempts, a power ramping step, a path loss conversion proportional coefficient, repetition times for sending a preamble, and a power indication parameter.

It should be understood that in this embodiment of this application, sequence numbers of the foregoing processes do not mean execution sequences. The execution sequences of the processes should be determined based on functions and internal logic of the processes, and should not constitute any limitation to implementation processes in this embodiment of this application.

In other words, in this embodiment of this application, an operation sequence of S310 and S320 is not limited.

Therefore, the network device receives the signal transmitted by the terminal device at the first transmit power, and the first transmit power is determined by the terminal device based on the access status of the terminal device at the current coverage level and/or the first power control parameter, thereby reducing interference between terminal devices.

The foregoing describes the signal transmission method according to this embodiment of this application. The following describes a terminal device according to an embodiment of this application.

FIG. 4 is a schematic block diagram of a terminal device 400 according to an embodiment of this application. As shown in FIG. 4, the terminal device 400 includes:

a determining module 410, configured to determine a first transmit power based on an access status of the terminal device at a current coverage level and/or a first power control parameter; and a transmission module 420, configured to transmit a signal at the first transmit power.

In this embodiment of this application, the terminal device 400 may determine the first transmit power based on the access status of the terminal device at the current coverage level and/or the first power control parameter, and transmit the signal at the first transmit power, so as to reduce interference between terminal devices.

Optionally, the access status of the terminal device at the current coverage level may be represented by using first determining information.

Optionally, the first power control parameter includes at least one of the following parameters:

reference signal received power RSRP, a downlink path loss, a transmission bandwidth parameter, a maximum transmit power of the terminal device, a preamble target received power, an initial preamble target received power, an initial transmit power, a preamble power offset; a quantity of preamble attempts; a power ramping step, a path loss conversion proportional coefficient, repetition times for sending a preamble, and a power indication parameter.

Optionally, the determining module 410 is configured to determine the first transmit power based on the first determining information and the first power control parameter.

Optionally, the determining module 410 is specifically configured to:

when the first determining information indicates that the terminal device is switched from a non-current coverage level to the current coverage level, calculate the first transmit power based on at least one of the first power control parameters by using an open-loop power control calculation method; or when the first determining information indicates that the terminal device selects the current coverage level during initial random access, calculate the first transmit power based on the at least one of the first power control parameters by using the open-loop power control calculation method.

Therefore, the terminal device 400 may select or calculate a proper first transmit power based on the first determining information and the first power control parameter, and does not need to directly transmit an uplink signal at the maximum transmit power, thereby reducing interference to uplink transmission of another terminal device.

Optionally, the determining module 410 is configured to determine the first transmit power based on the first power control parameter.

Optionally, the first power control parameter includes the downlink path loss, and the determining module 410 is specifically configured to:

when the downlink path loss of the terminal device is greater than a first path loss threshold, use the maximum transmit power of the terminal device as the first transmit power, where the first path loss threshold is notified by a network device to the terminal device; or when the downlink path loss of the terminal device is less than or equal to the first path loss threshold, calculate the first transmit power by using an open-loop power control calculation method.

Optionally, the first power control parameter includes a reference signal received power RSRP value, and the second determining module 410 is specifically configured to:

when the reference signal received power RSRP value measured by the terminal device is greater than a first RSRP threshold, use the maximum transmit power of the terminal device as the first transmit power, where the first RSRP threshold is notified by a network device to the terminal device; or when the reference signal received power RSRP value measured by the terminal device is less than or equal to the first RSRP threshold, calculate the first transmit power by using an open-loop power control calculation method.

Therefore, the terminal device 400 may select or calculate a proper first transmit power based on the first power control parameter, and does not need to directly transmit an uplink signal at the maximum transmit power, thereby reducing interference to uplink transmission of another terminal device.

Optionally, the determining module 410 is configured to determine the first transmit power based on the first determining information.

Optionally, the determining module 410 is specifically configured to:

when the first determining information indicates that the terminal device selects the current coverage level during initial random access, use the maximum transmit power of the terminal device as the first transmit power.

Therefore, after determining is performed based on the first determining information, the terminal device 400 may determine whether to use the maximum transmit power as the first transmit power, so that the terminal device does not directly use the maximum transmit power to transmit an uplink signal, thereby reducing interference to uplink transmission of another terminal device.

Optionally, the open-loop power control calculation method meets the following formulas:

$$P_{NPRACH} = \min\left\{ \begin{array}{l} P_{CMAX,c}(i), \\ P_{PRT} + PL_c \end{array} \right\}, \text{ and}$$

$$P_{PRT} = P_{PIRT} + P_{DP} + (N_{p1} - 1) \times P_s - 10\log_{10}N_{p2},$$

where $P_{NPRACH}$ represents the first transmit power; $P_{CMAX,c}(i)$ represents the maximum transmit power of the terminal device; c is a cell number; i is a subframe number; $P_{PRT}$ represents a preamble target received power; $PL_c$ represents a downlink path loss value, obtained by the terminal device through measurement, of the cell c; $P_{PIRT}$ represents an initial preamble target received power; $P_{DP}$ represents a preamble power offset; $N_{P1}$ represents a quantity of preamble attempts; $P_s$ represents a power ramping step; and $N_{P2}$ represents a quantity of repetition times for currently sending a preamble.

According to this embodiment of this application, the terminal device 400 may perform the method on the terminal device side in the signal transmission method in the embodiments of this application. The foregoing and other operations and/or functions of the modules or units in the terminal device 400 are separately used to implement corresponding procedures of the method. For brevity, details are not described herein.

Therefore, in this embodiment of this application, the terminal device 400 may determine the first transmit power based on the first determining information and/or the first power control parameter, and transmit the signal at the first transmit power, so as to reduce interference between terminal devices.

Figure 5:
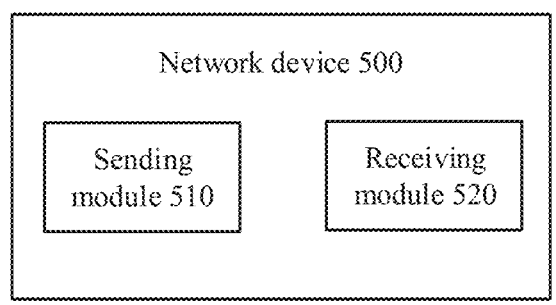
FIG. 5 is a schematic block diagram of a network device according to an embodiment of this application.

FIG. 5 is a schematic block diagram of a network device 500 according to an embodiment of this application. As shown in FIG. 5, the network device 500 includes:

a sending module 510; configured to send first indication information to a terminal device, where the first indication information is used to indicate at least one of first power control parameters; and a receiving module 520, configured to receive a signal transmitted by the terminal device at a first transmit power, where the first transmit power is determined by the terminal device based on an access status of the terminal device at a current coverage level and/or the first power control parameter.

Optionally, the first power control parameter includes at least one of the following parameters:

reference signal received power RSRP, a downlink path loss, a transmission bandwidth parameter, a maximum transmit power of the terminal device, a preamble target received power, an initial preamble target received power, an initial transmit power, a preamble power offset, a quantity of preamble attempts, a power ramping step, a path loss conversion proportional coefficient, repetition times for sending a preamble, and a power indication parameter.

According to this embodiment of this application, the network device 500 may perform the method on the network device side in the signal transmission method in the embodiments of this application. The foregoing and other operations and/or functions of the modules in the network device 500 are separately used to implement corresponding procedures of the methods. For brevity, details are not described herein.

In this embodiment of this application, the network device 500 receives the signal transmitted by the terminal device at the first transmit power, and the first transmit power is determined by the terminal device based on the access status of the terminal device at the current coverage level and/or the first power control parameter, thereby reducing interference between terminal devices.

Figure 6:
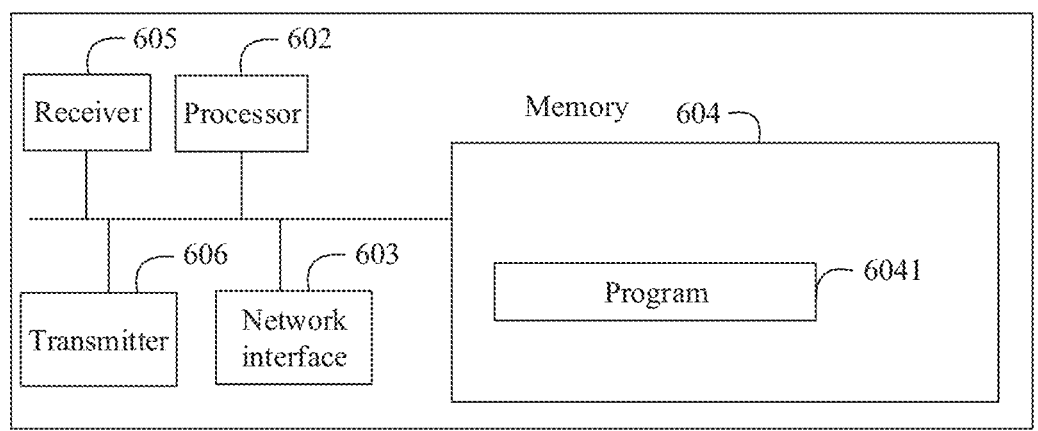
FIG. 6 is a structural block diagram of a terminal device according to an embodiment of this application.

FIG. 6 shows a structure of a terminal device according to an embodiment of this application. The terminal device includes at least one processor 602 (for example, a CPU), at least one network interface 603 or another communications interface, and a memory 604. Optionally, the terminal device may further include a receiver 605 and a transmitter 606. The processor 602 is configured to execute an executable module, such as a computer program, that is stored in the memory 604. The memory 604 may include a high-speed random access memory RAM, and may also further include a non-volatile memory (non-volatile memory), for example, at least one magnetic disk storage. The at least one network interface 603 (which may be wired or wireless) is configured to implement a communications connection to at least one another network element. The receiver 605 and the transmitter 606 are configured to transmit various signals or information.

In some implementations, the memory 604 stores a program 6041, and the program 6041 may be executed by the processor 602, to perform the method on the terminal device side in the foregoing another embodiment of this application.

Figure 7:
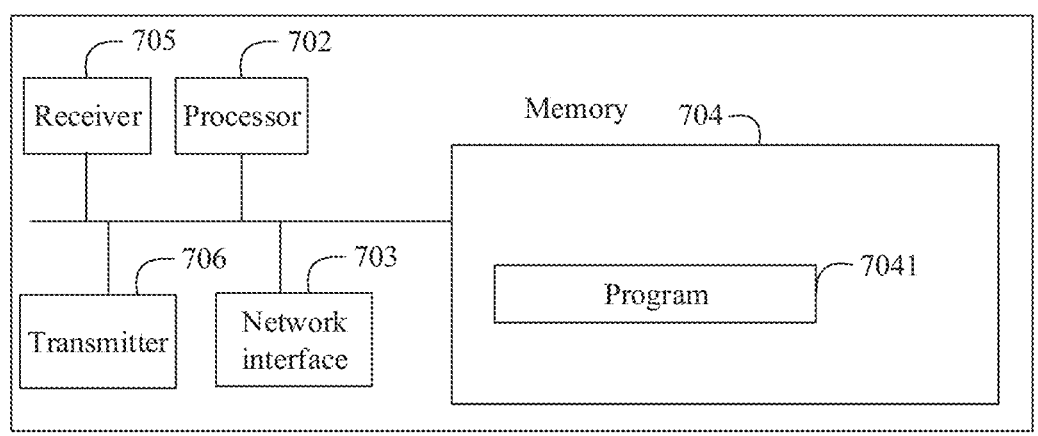
FIG. 7 is a structural block diagram of a network device according to an embodiment of this application.

FIG. 7 shows a structure of a network device according to an embodiment of this application. The network device includes at least one processor 702 (for example, a CPU), at least one network interface 703 or another communications interface, and a memory 704. Optionally, the network device may further include a receiver 705 and a transmitter 706. The processor 702 is configured to execute an executable module, such as a computer program, that is stored in the memory 704. The memory 704 may include a high-speed random access memory RAM, and may also include a non-volatile memory (non-volatile memory), for example, at least one magnetic disk storage. The at least one network interface 703 (which may be wired or wireless) is configured to implement a communications connection to at least one another network element. The receiver 705 and the transmitter 706 are configured to transmit various signals or information.

In some implementations, the memory 704 stores a program 7041. The program 7041 may be executed by the processor 702, and is used to perform the method on the network device side in the foregoing embodiment of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that in the embodiments of this application, sequence numbers of the foregoing processes do not mean execution sequences. The execution sequences of the processes should be determined based on functions and internal logic of the processes, and should not constitute any limitation to implementation processes in the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of a technical solution. For specific applications, a person skilled in the alt may use different methods to implement the described functions; however, this implementation should not be construed as going beyond the scope of the embodiments of this application.

It may be clearly understood by a person skilled in the art that, for convenience and brevity of description, for specific working processes of the system, apparatus, and unit described above, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, displayed or discussed mutual couplings or direct couplings or communication connections may be implemented by using some interfaces. The indirect couplings or communication connections between the apparatuses or units may be implemented in electronically, mechanically, or in another form.

The units described as separate parts may or may not be physically separate; and parts displayed as units may or may not be physical units, in other words, may be located in one position, or may be distributed on a plurality of network units. Some or all of the units may be selected based on actual requirements to achieve the objectives of the solutions in the embodiments.

In addition, functional units in the embodiments of the present invention may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of the embodiments in this application essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: various media that can store program code, such as a USB flash drive, a removable hard disk, a read-only memory (Read-Only Memory, ROM), a random access memory (Random Access Memory, RAM), a magnetic disk, and an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A signal transmission method, comprising:
    obtaining first determining information indicating a first access status of a terminal device at a first coverage level;
    determining, based on the first determining information, whether to use a maximum transmit power of the terminal device for transmitting a first signal, wherein determining, based on the first determining information, whether to use the maximum transmit power comprises:
    in response to determining, based on the first determining information, that the terminal device is switched from a second coverage level to the first coverage level,
        calculating a first transmit power based on the first access status of the terminal device at the first coverage level and a first power control parameter by using an open-loop power control calculation method, wherein calculating the first transmit power based on the first access status of the terminal device at the first coverage level and the first power control parameter comprises in response to determining that a first reference signal received power (RSRP) value measured by the terminal device is within a first RSRP range or a first path loss measured by the terminal device is within a first path loss range, calculating the first transmit power by using the open-loop power control calculation method; and
        transmitting the first signal using the first transmit power; and
    obtaining second determining information indicating a second access status of the terminal device at a third coverage level; and
    determining, based on the second determining information, whether to use the maximum transmit power of the terminal device for transmitting a second signal, wherein determining, based on the second determining information, whether to use the maximum transmit power for transmitting the second signal comprises:
    in response to determining, based on the second determining information, that the terminal device selects the third coverage level during initial random access or in response to determining that a second RSRP value measured by the terminal device is within a second RSRP range or a second path loss is within a second path loss range, transmitting the second signal using the maximum transmit power of the terminal device, wherein the second RSRP range is different from the first RSRP range, and the second path loss range is different from the first path loss range.

2. The method according to claim 1, wherein the first power control parameter comprises at least one of the following parameters:
    a downlink path loss, the maximum transmit power of the terminal device, a preamble target received power, an initial preamble target received power, a preamble power offset, a quantity of preamble attempts, a power ramping step, or repetition times for sending a preamble.

3. The method according to claim 2, wherein the first power control parameter comprises the downlink path loss, and calculating the first transmit power based on the first access status of the terminal device at the first coverage level and the first power control parameter comprises:
    if the downlink path loss of the terminal device is greater than a first path loss threshold, using the maximum transmit power of the terminal device as the first transmit power; or
    if the downlink path loss of the terminal device is less than or equal to the first path loss threshold, calculating the first transmit power by using the open-loop power control calculation method.

4. A signal transmission method, comprising:
sending first indication information to a terminal device, wherein the first indication information indicates a first power control parameter;
sending first determining information to the terminal device, wherein the first determining information indicates a first access status of the terminal device at a first coverage level;
receiving a first signal transmitted by the terminal device at a first transmit power, wherein the first transmit power is determined by the terminal device based on the first access status of the terminal device at the first coverage level and the first power control parameter, wherein the first transmit power is calculated by using an open-loop power control calculation method in response to determining that a first reference signal received power (RSRP) value measured by the terminal device is within a first RSRP range or a first path loss measured by the terminal device is within a first path loss range;
sending second determining information to the terminal device, wherein the second determining information indicates a second access status of the terminal device at a third coverage level; and
receiving a second signal transmitted by the terminal device at a maximum transmit power of the terminal device, wherein the maximum transmit power of the terminal device used for transmitting the second signal is determined by the terminal device based on the second determining information indicating that the terminal device selects the third coverage level during initial random access or in response to determining that a second RSRP value measured by the terminal device is within a second RSRP range or a second path loss is within a second path loss range, wherein the second RSRP range is different from the first RSRP range, and the second path loss range is different from the first path loss range.

5. The method according to claim 4, wherein the first power control parameter comprises at least one of the following parameters:
a downlink path loss, the maximum transmit power of the terminal device, a preamble target received power, an initial preamble target received power, a preamble power offset, a quantity of preamble attempts, a power ramping step, or repetition times for sending a preamble.

6. A communication device, comprising:
a transmitter; and
at least one processor coupled with a non-transitory computer-readable storage medium storing programming instructions for execution by the at least one processor, wherein the programming instructions instruct:
the at least one processor to:
obtain first determining information indicating a first access status at a first coverage level and a first power control parameter;
determine, based on the first determining information, whether to use a maximum transmit power of the communication device for transmitting a first signal, wherein determining, based on the first determining information, whether to use the maximum transmit power comprises:
in response to determining, based on the first determining information, that the communication device is switched from a second coverage level to the first coverage level, calculating a first transmit power based on the first access status of the communication device at the first coverage level and the first power control parameter by using an open-loop power control calculation method, wherein calculating the first transmit power based on the first access status of the communication device at the first coverage level and the first power control parameter comprises in response to determining that a first reference signal received power (RSRP) value measured by the communication device is within a first RSRP range or a first path loss measured by the communication device is within a first path loss range, calculating the first transmit power by using the open-loop power control calculation method; and
the transmitter to transmit the first signal at the first transmit power;
obtain second determining information indicating a second access status of the communication device at a third coverage level; and
determine, based on the second determining information, whether to use the maximum transmit power of the communication device for transmitting a second signal, wherein determining, based on the second determining information, whether to use the maximum transmit power for transmitting the second signal comprises:
in response to determining, based on the second determining information, that the communication device selects the third coverage level during initial random access or in response to determining that a second RSRP value measured by the communication device is within a second RSRP range or a second path loss is within a second path loss range, transmit the second signal using the maximum transmit power of the communication device, wherein the second RSRP range is different from the first RSRP range, and the second path loss range is different from the first path loss range.

7. The device according to claim 6, wherein the first power control parameter comprises at least one of the following parameters:
a downlink path loss, the maximum transmit power, a preamble target received power, an initial preamble target received power, a preamble power offset, a quantity of preamble attempts, a power ramping step, or repetition times for sending a preamble.

8. The device according to claim 6, wherein the programming instructions instruct the at least one processor to:
if a path loss is greater than a first path loss threshold, use the maximum transmit power as the first transmit power; or
if the path loss is less than or equal to the first path loss threshold, calculate the first transmit power by using the open-loop power control calculation method.

9. A communication device, comprising:
a transmitter, configured to:
send first indication information to a terminal device, wherein the first indication information indicates a first power control parameter;
send first determining information to the terminal device, wherein the first determining information indicates a first access status of the terminal device at a first coverage level; and
send second determining information to the terminal device, wherein the second determining information indicates a second access status of the terminal device at a third coverage level; and a receiver, configured to:
receive a first signal transmitted by the terminal device at a first transmit power, wherein the first transmit power is determined by the terminal device based on the first access status of the terminal device at the first coverage level, the first power control parameter, or both, wherein the first transmit power is calculated by using an open-loop power control calculation method in response to determining that a first reference signal received power (RSRP) value measured by the terminal device is within a first RSRP range or a first path loss measured by the terminal device is within a first path loss range; and
receive a second signal transmitted by the terminal device at a maximum transmit power of the terminal device, wherein the maximum transmit power of the terminal device used for transmitting the second signal is determined by the terminal device based on the second determining information indicating that the terminal device selects the third coverage level during initial random access or in response to determining that a second RSRP value measured by the terminal device is within a second RSRP range or a second path loss is within a second path loss range, wherein the second RSRP range is different from the first RSRP range, and the second path loss range is different from the first path loss range.

10. The device according to claim 9, wherein the first power control parameter comprises at least one of the following parameters:
a downlink path loss, the maximum transmit power of the terminal device, a preamble target received power, an initial preamble target received power, a preamble power offset, a quantity of preamble attempts, a power ramping step, repetition times for sending a preamble.

\* \* \* \* \*